United States Patent
Lee et al.

(10) Patent No.: US 11,448,290 B1
(45) Date of Patent: Sep. 20, 2022

(54) TRANSMISSION

(71) Applicants: Hyundai Motor Company, Seoul (KR); Kia Corporation, Seoul (KR)

(72) Inventors: Kang Hoon Lee, Goyang-Si (KR); Yeong Hoon Kim, Seoul (KR); Dong Hwan Hwang, Seoul (KR); Jin Won Seok, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/476,263

(22) Filed: Sep. 15, 2021

(30) Foreign Application Priority Data

Apr. 22, 2021  (KR) ........................ 10-2021-0052482

(51) Int. Cl.
  *F16H 3/46*  (2006.01)
(52) U.S. Cl.
  CPC ....... *F16H 3/46* (2013.01); *F16H 2200/0034* (2013.01); *F16H 2200/2005* (2013.01); *F16H 2200/2033* (2013.01); *F16H 2200/2064* (2013.01); *F16H 2200/2094* (2013.01)
(58) Field of Classification Search
  CPC ............... F16H 3/46; F16H 2200/0034; F16H 2200/2005; F16H 2200/2033; F16H 2200/2035; F16H 2200/2064; F16H 2200/2094; F16D 21/00; F16D 25/082; F16D 67/02; F16D 67/04
  See application file for complete search history.

(56) References Cited

U.S. PATENT DOCUMENTS

| | | | | |
|---|---|---|---|---|
| 5,518,465 A | * | 5/1996 | Hiraiwa | F16H 3/663 475/275 |
| 7,108,115 B2 | * | 9/2006 | Ebenhoch | F16D 25/0638 192/53.1 |
| 9,222,549 B2 | * | 12/2015 | Mellet | F16H 3/66 |
| 2013/0267378 A1 | * | 10/2013 | Hiraiwa | B60K 6/365 475/5 |

FOREIGN PATENT DOCUMENTS

KR  10-2016-0024077  3/2016

* cited by examiner

*Primary Examiner* — Huan Le
(74) *Attorney, Agent, or Firm* — Morgan, Lewis & Bockius LLP

(57) ABSTRACT

A transmission apparatus may include a planetary gear set including three rotation elements, a dog clutch provided to selectively fix one rotation element of the planetary gear set, input and output shafts connected to two remaining rotation elements, a friction clutch provided to vary frictional force between two arbitrary rotation elements, a linear actuator provided to form linear displacement, a push member provided to receive the linear displacement and to apply pressure to the friction clutch to increase frictional force thereof, a return spring elastically supporting the push member in a direction of releasing the frictional force of the friction clutch, a one-way interlocking structure provided between a sleeve and the push member, and a release spring provided to elastically support the sleeve with respect to the push member in a direction of releasing the dog clutch.

15 Claims, 7 Drawing Sheets

TRANSMISSION

CROSS-REFERENCE TO RELATED APPLICATION

The present application claims priority to Korean Patent Application No. 10-2021-0052482, filed on Apr. 22, 2021, the entire contents of which is incorporated herein for all purposes by this reference.

BACKGROUND OF THE INVENTION

Field of the invention

The present invention relates to a transmission apparatus which may change input rotating power into a plurality of different speeds and output the speeds.

Description of Related Art

A transmission apparatus is provided between a power source configured to generate rotating power and driving wheels configured to use the power, and the transmission apparatus may change the power of the power source into an appropriate speed depending on the driving situation of a vehicle which is being changed and then provide the speed to the driving wheels of the vehicle, thereby being capable of securing the driving performance of the vehicle within as wide a range as possible with the limited performance of the power source.

It is desirable that such a transmission apparatus has low manufacturing costs and a low weight through a simple configuration, and minimizes energy consumed to operate the transmission.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a transmission apparatus which may achieve cost reduction and weight reduction through a simple configuration, may minimize energy consumed to operate the transmission, and may thus reduce the manufacturing costs and weight of a vehicle and improve the fuel efficiency of the vehicle when the transmission apparatus is ultimately mounted in the vehicle.

In accordance with an aspect of the present invention, the above and other objects may be accomplished by the provision of a transmission apparatus including a planetary gear set including three rotation elements, a dog clutch provided to selectively fix one rotation element of the planetary gear set, an input shaft and an output shaft respectively connected to two remaining rotation elements of the planetary gear set, a friction clutch provided to vary frictional force between two arbitrary rotation elements of the planetary gear set, a linear actuator provided to transmit linear displacement to apply pressure to the friction clutch, a push member provided to receive the linear displacement transmitted from the linear actuator and to apply the pressure to the friction clutch to increase the frictional force of the friction clutch, a return spring elastically supporting the push member in a direction of releasing the frictional force of the friction clutch, a one-way interlocking structure provided between a sleeve of the dog clutch and the push member to move the sleeve in a direction of engaging the dog clutch when the push member is moved in a direction of releasing the frictional force of the friction clutch, and a release spring provided to elastically support the sleeve with respect to the push member in a direction of releasing the dog clutch.

The one-way interlocking structure may include a relatively uneven structure between the push member and the sleeve.

The friction clutch may be provided to vary frictional force between the rotation element of the planetary gear set, selectively fixed to the dog clutch, and another rotation element configured such that the input shaft is connected thereto.

The linear actuator may include a piston driven by hydraulic pressure, and a bearing may be provided between the piston and the push member to enable relative rotation thereof The planetary gear set may be a double-pinion planetary gear set, the input shaft may be connected to a planet carrier of the planetary gear set, the output shaft may be connected to a ring gear of the planetary gear set, and a sun gear of the planetary gear set may be configured to be selectively fixed by the dog clutch.

The friction clutch may be provided between the sun gear and the planet carrier of the planetary gear set.

In accordance with another aspect of the present invention, there is provided a complex clutch mechanism for transmissions, the complex clutch mechanism including a dog clutch provided to selectively fix one rotation element of a planetary gear set, a friction clutch configured for providing frictional force between another rotation element of the planetary gear set and the rotation element configured such that the dog clutch is connected thereto, a push member configured to be moved relative to a sleeve of the dog clutch when the push member is linearly moved in a direction of applying pressure to the friction clutch and to be moved in a state of being interlocked with the sleeve when the push member is linearly moved in a direction of releasing the pressure from the friction clutch, a return spring elastically supporting the push member in the direction of releasing the pressure from the friction clutch, and a release spring provided to elastically support the sleeve with respect to the push member in a direction of releasing the dog clutch.

The push member may include a first engaging protrusion configured to protrude toward the sleeve, and the sleeve may include a second engaging protrusion engaged with the first engaging protrusion so that the sleeve is moved together with the push member.

The push member may receive pressure applied by a piston configured to be linearly moved, through a bearing, and may transmit the received pressure to the friction clutch.

The dog clutch may include a hub gear formed integrally with a rotation element of the planetary gear set, a clutch gear configured to be fixed, and the sleeve provided to linearly slide in a state of being engaged with an external portion of the hub gear to be engaged with the clutch gear.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural or functional descriptions in embodiments of the present invention set forth in the description which follows will be exemplarily provided to describe the exemplary embodiments of the present invention, but the present invention may be embodied in many alternative forms and may not be construed as being limited to the exemplary embodiments set forth herein.

The exemplary embodiments of the present invention may be variously modified and changed, and thus specific embodiments of the present invention will be illustrated in the drawings and described in detail in the following description of the exemplary embodiments of the present invention. However, it will be understood that the exemplary embodiments of the present invention are provided only to completely include the present invention and cover modifications, equivalents or alternatives which come within the scope and technical range of the present invention.

In the following description of the embodiments, terms, such as "first" and "second", are used only to describe various elements, and these elements may not be construed as be limited by these terms. These terms are used only to distinguish one rotation element from other elements. For example, a first element described hereinafter may be termed a second element, and similarly, a second element described hereinafter may be termed a first element, without departing from the scope of the present invention.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

The terminology used herein is for the purpose of describing various exemplary embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless defined otherwise, all terms including technical and scientific terms used in the following description have the same meanings as those of terms generally understood by those in the skill in the art. Terms defined in generally used dictionaries will be interpreted as having meanings coinciding with contextual meanings in the related technology, and are not to be interpreted as having ideal or excessively formal meanings unless defined clearly in the description.

Hereinafter, reference will be made in detail to various embodiments of the present invention, examples of which are illustrated in the accompanying drawings and described below. In the drawings, the same or similar elements are denoted by the same reference numerals even when they are depicted in different drawings.

Referring to FIGS. 1 to 7, a transmission apparatus according to various exemplary embodiments of the present invention includes a planetary gear set PG including three rotation elements, a dog clutch DC provided to selectively fix one rotation element of the planetary gear set PG, an input shaft IN and an output shaft OUT, respectively connected to the two remaining rotation elements of the planetary gear set PG, a friction clutch FC provided to continuously vary frictional force between two arbitrary rotation elements of the planetary gear set PG, a linear actuator provided to transmit linear displacement to apply pressure to the friction clutch FC, a push member PM provided to receive the linear displacement transmitted by the linear actuator and to apply the pressure to the friction clutch to increase the frictional force of the friction clutch FC, a return spring TS configured to elastically support the push member PM in a direction of releasing the frictional force of the friction clutch FC, a one-way interlocking structure provided between a sleeve SB of the dog clutch DC and the push member PM to move the sleeve SB in a direction of engaging the dog clutch DC when the push member PM is moved in a direction of releasing the frictional force of the friction clutch FC, and a release spring RS provided to elastically support the sleeve SB with respect to the push member PM in a direction of releasing the dog clutch DC.

That is, the transmission apparatus according to various exemplary embodiments of the present invention, power input to the planetary gear set PG through the input shaft IN is changed into a first speed or a second speed depending on the operating states of the dog clutch DC and the friction clutch FC and the first speed or the second speed is output through the output shaft.

Figure 1:
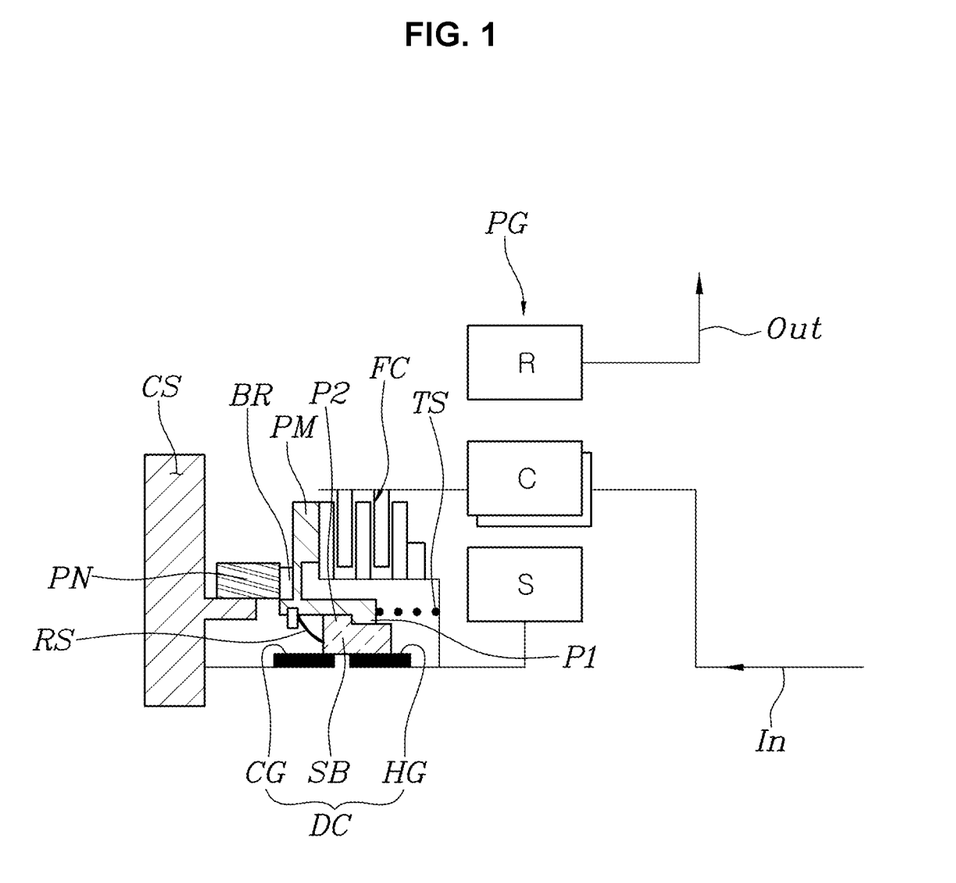
FIG. 1 is a view exemplarily illustrating a transmission apparatus in a first gear position according to various exemplary embodiments of the present invention.
Figure 2:
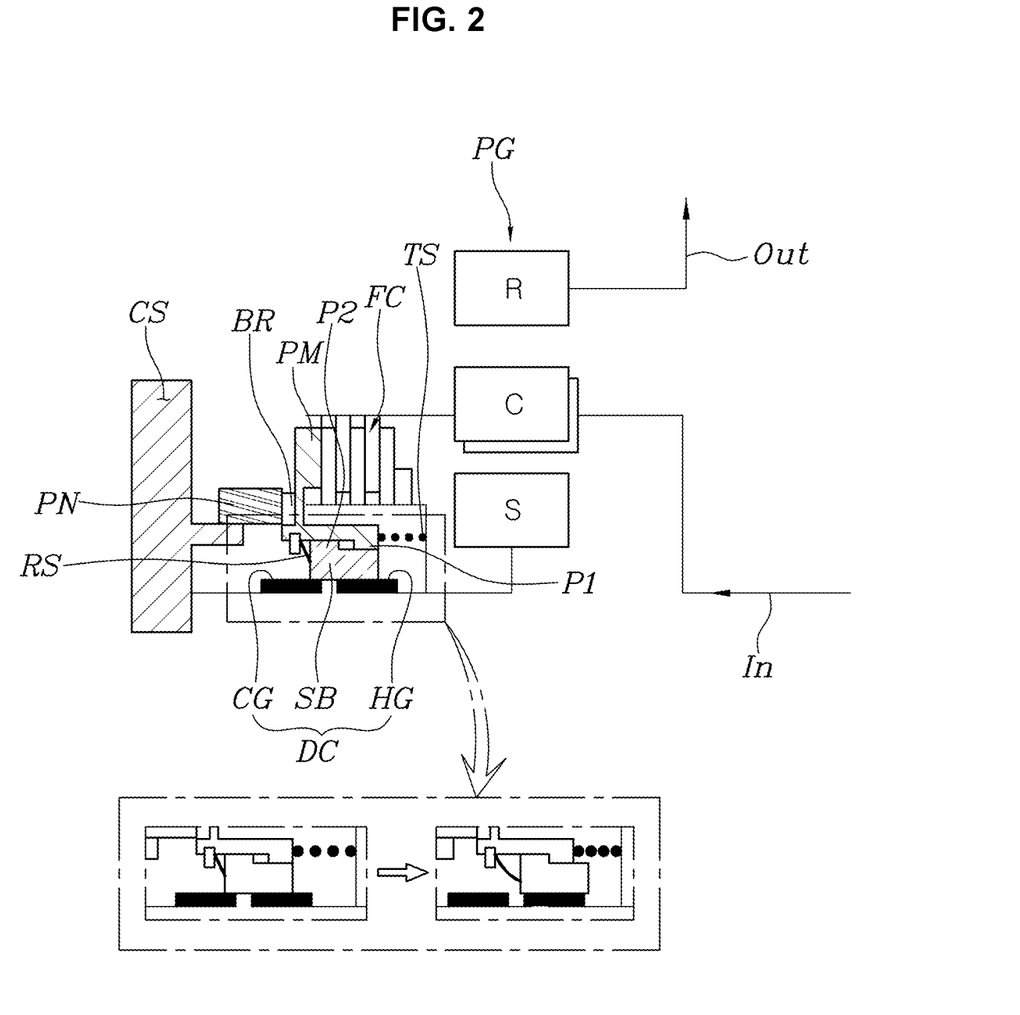
FIG. 2 is a view exemplarily illustrating a process for shifting the transmission apparatus of FIG. 1 to a second gear position.
Figure 3:
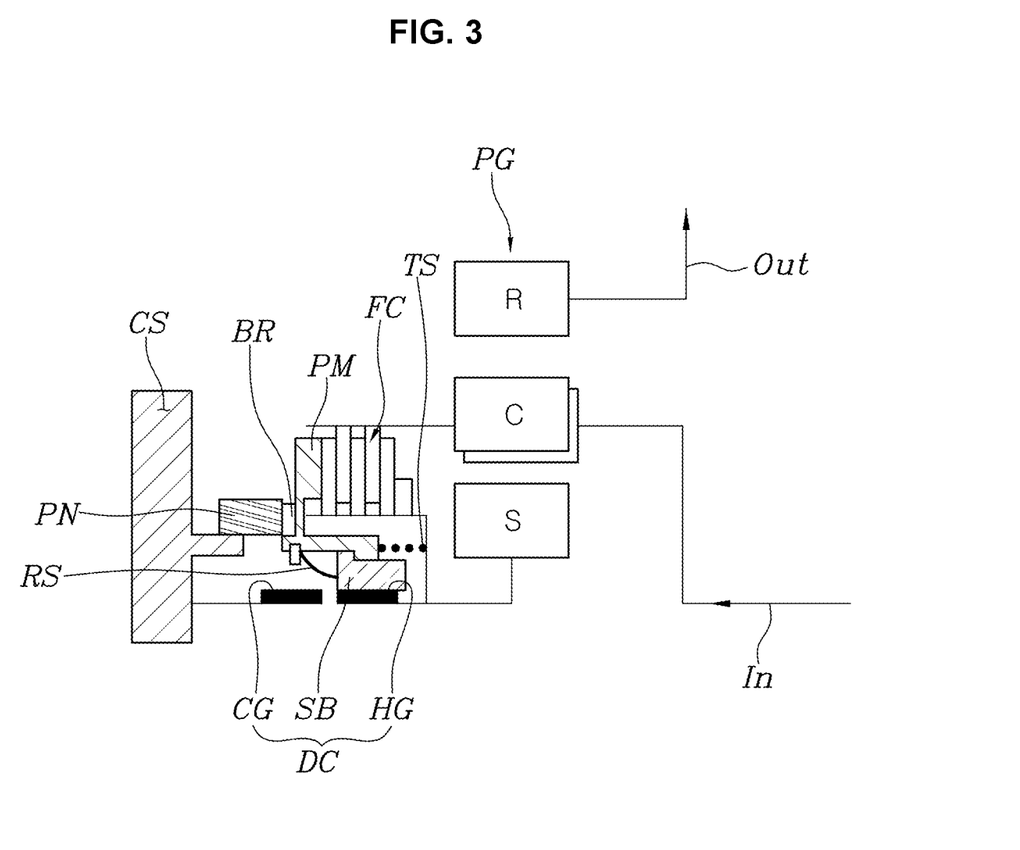
FIG. 3 is a view exemplarily illustrating the transmission apparatus of FIG. 2 in the second gear position.

FIG. 1 illustrates a state in which the dog clutch DC is engaged and the friction clutch FC is released, i.e., a first speed state in which power input through the input shaft IN is reduced to the first speed by the planetary gear set PG and then the first speed is output through the output shaft OUT, FIG. 2 illustrates a process of shifting to the second speed, i.e., a process of engaging the friction clutch FC and releasing the dog clutch DC, and FIG. 3 illustrates a state in which shifting to the second speed is completed, i.e., a second speed state in which the dog clutch DC is completely released, power input to the planetary gear set PG is not reduced and is then output through the output shaft OUT as is.

In the exemplary embodiment of the present invention, the linear actuator includes a piston PN driven by hydraulic pressure, and a bearing BR is provided between the piston PN and the push member PM to enable relative rotation thereof.

Of course, the linear actuator may include an electric motor configured to generate linear displacement, besides the piston PN driven by hydraulic pressure.

In the exemplary embodiment of the present invention, the one-way interlocking structure includes a relatively uneven structure between the push member PM and the sleeve SB.

That is, the push member PM may include a first engaging protrusion P1 protruding toward the sleeve SB, the sleeve SB may include a second engaging protrusion P2 engaged with the first engaging protrusion P1 so that the sleeve SB is moved together with the push member PM, and thereby, the first engaging protrusion P1 and the second engaging protrusion P2 may form the relatively uneven structure between the push member PM and the sleeve SB.

Therefore, when the push member PM is moved to the right, as shown in FIG. 1, FIG. 2, and FIG. 3, the first engaging protrusion P1 does not meet the second engaging protrusion P2, and thus, the push member PM may be moved to the right relative to the sleeve SB and apply pressure to the friction clutch FC even though the sleeve SB is not moved to the right, and when the push member PM is moved to the left, the first engaging protrusion P1 meets the second engaging protrusion P2, the first and second engaging protrusions P1 and P2 are moved together, and thus, the sleeve SB engages the dog clutch DC.

Of course, the relatively uneven structure forming the one-way interlocking structure may be implemented through a method in which a protrusion protruding toward the counterpart is formed on any one of the push member PM and the sleeve SB and a recess configured to receive the protrusion is formed in the other, besides the relatively uneven structure having the first and second engaging protrusions P1 and P2.

In the exemplary embodiment of the present invention, the friction clutch FC is provided to vary frictional force between the rotation element of the planetary gear set PG which is selectively fixed to the dog clutch DC, and another rotation element to which the input shaft IN is connected.

That is, in the present exemplary embodiment shown in FIG. 1, the planetary gear set PG is a double-pinion planetary gear set, the input shaft IN is connected to a planet carrier C of the planetary gear set PG, the output shaft OUT is connected to a ring gear R of the planetary gear set PG, a sun gear S of the planetary gear set PG is configured to be selectively fixed by the dog clutch DC, and the friction clutch FC is provided between the sun gear S and the planet carrier C of the planetary gear set PG.

Here, because the remaining elements of the transmission apparatus other than the planetary gear set PG are regarded as forming a clutch mechanism having a complex structure, the complex clutch mechanism according to various exemplary embodiments of the present invention includes the dog clutch DC provided to selectively fix one rotation element of the planetary gear set PG, the friction clutch FC provided to form frictional force between another rotation element of the planetary gear set PG and the rotation element to which the dog clutch DC is connected, the push member PM configured to be moved relative to the sleeve SB of the dog clutch DC when the push member PM is linearly moved in a direction of applying pressure to the friction clutch FC and to be moved in the state of being interlocked with the sleeve SB when the push member PM is linearly moved in a direction of releasing the pressure from the friction clutch FC, the return spring TS configured to elastically support the push member PM in the direction of releasing the pressure from the friction clutch FC, and the release spring RS provided to elastically support the sleeve SB with respect to the push member PM in the direction of releasing the dog clutch DC.

The push member PM includes the first engaging protrusion P1 protruding toward the sleeve SB, and the sleeve SB includes the second engaging protrusion P2 engaged with the first engaging protrusion P1 so that the sleeve SB is moved together with the push member PM.

The push member PM receives pressure applied by the piston PN, which is linearly moved, through the bearing BR, and transmits the received pressure to the friction clutch FC.

The dog clutch DC include a hub gear HG formed integrally with the rotation element of the planetary gear set PG, a clutch gear CG configured to be fixed, and the sleeve SB provided to linearly slide in the state of being engaged with the external portion of the hub gear HG to be engaged with the clutch gear CG.

That is, the clutch gear CG is fixed to a transmission housing CS or the like, and when the sleeve SB is engaged with both the hub gear HG and the clutch gear CG, the rotation element provided with the hub gear HG is in a fixed state.

Hereinafter, a process of shifting the transmission apparatus including the complex clutch mechanism having the above-described configuration according to various exemplary embodiments of the present invention from the first speed state to the second speed state will be described with reference to FIGS. 1 to 7.

FIG. 1 illustrates the first speed state, i.e., the state in which the dog clutch DC is engaged and the friction clutch FC is released, as described above.

Because the dog clutch DC continues to maintain the state of fixing the sun gear S of the planetary gear set PG without additional energy consumption, the transmission apparatus according to various exemplary embodiments of the present invention may stably maintain the first speed state without additional energy consumption.

Therefore, energy consumed to operate the transmission apparatus may be reduced.

To shift the transmission apparatus to the second speed state, when the piston PN, which is the linear actuator, is moved toward the friction clutch FC to form linear displacement, the push member PM receives the linear displacement transmitted by the piston PN and is thus moved to apply pressure to the friction clutch FC, frictional force between the planet carrier C and the sun gear S of the planetary gear set PG is increased so that the rotation speeds of the planet carrier C and the sun gear S are synchronized, and thus, the planetary gear set PG enters the state in which all the rotation elements thereof are rotated at the same speed to output the second speed.

Here, the dog clutch DC must be released so that the sun gear S is rotated with the remaining rotation elements C and R to form the second speed state, and release of the dog clutch DC is conducted by moving the push member PM in a direction of increasing the frictional force of the friction clutch FC.

That is, when the push member PM is moved in the direction of increasing the frictional force of the friction clutch FC, in the beginning, the push member PM is moved but the sleeve SB is not moved, as shown in FIG. 2.

The reason for this is that the sleeve SB is not easily released from the clutch gear CG due to torque between the sleeve SB of the dog clutch DC and the clutch gear CG.

Figure 4:
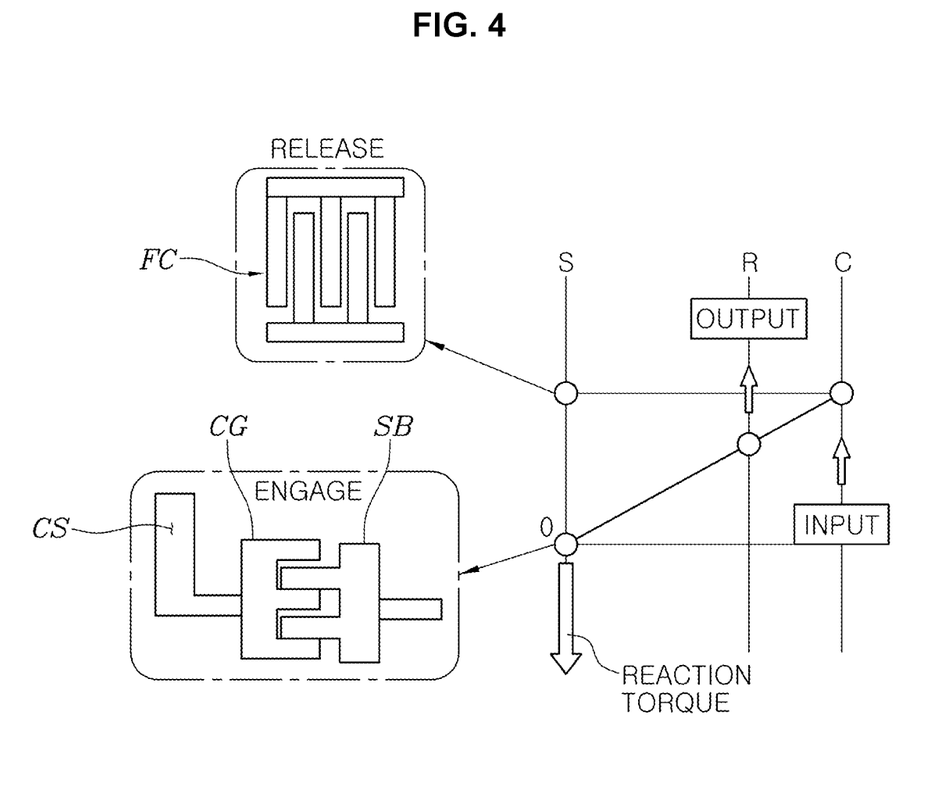
FIG. 4, FIG. 5, FIG. 6 and FIG. 7 are views sequentially illustrating a process for shifting the transmission apparatus of FIG. 1 from the first gear position to the second gear position, and showing the states of a friction clutch and a dog clutch together with lever diagrams of a planetary gear set.
Figure 5:
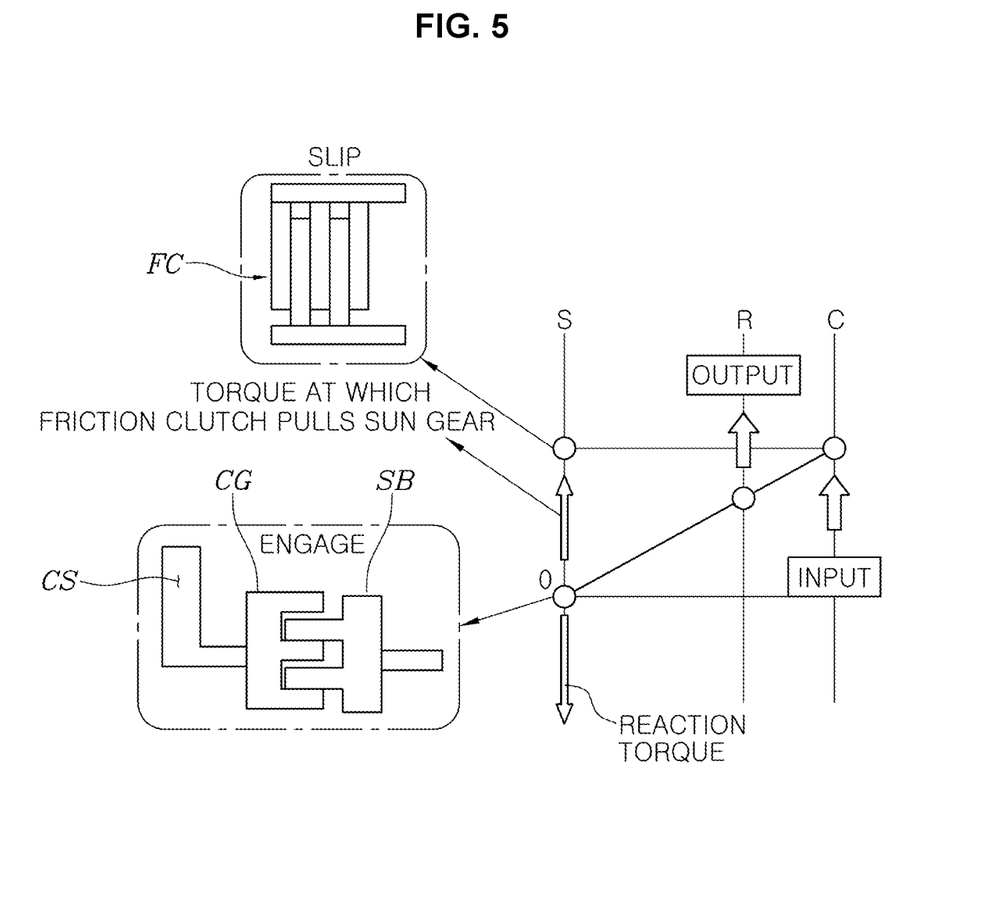

That is, in the first speed state shown in FIG. 4, the sun gear S must provide reaction torque to input torque input to the planet carrier C, and the reaction torque is applied between the clutch gear CG and the sleeve SB and thus forms frictional force between the sleeve SB and the clutch gear CG. Therefore, even though the push member PM is moved and the friction clutch FC starts to generate frictional force, as shown in FIG. 5, in the beginning, the frictional force between the sleeve SB and the clutch gear SG is greater than the elastic force of the release spring RS and thus the sleeve SB is not released from the clutch gear CG.

Figure 6:
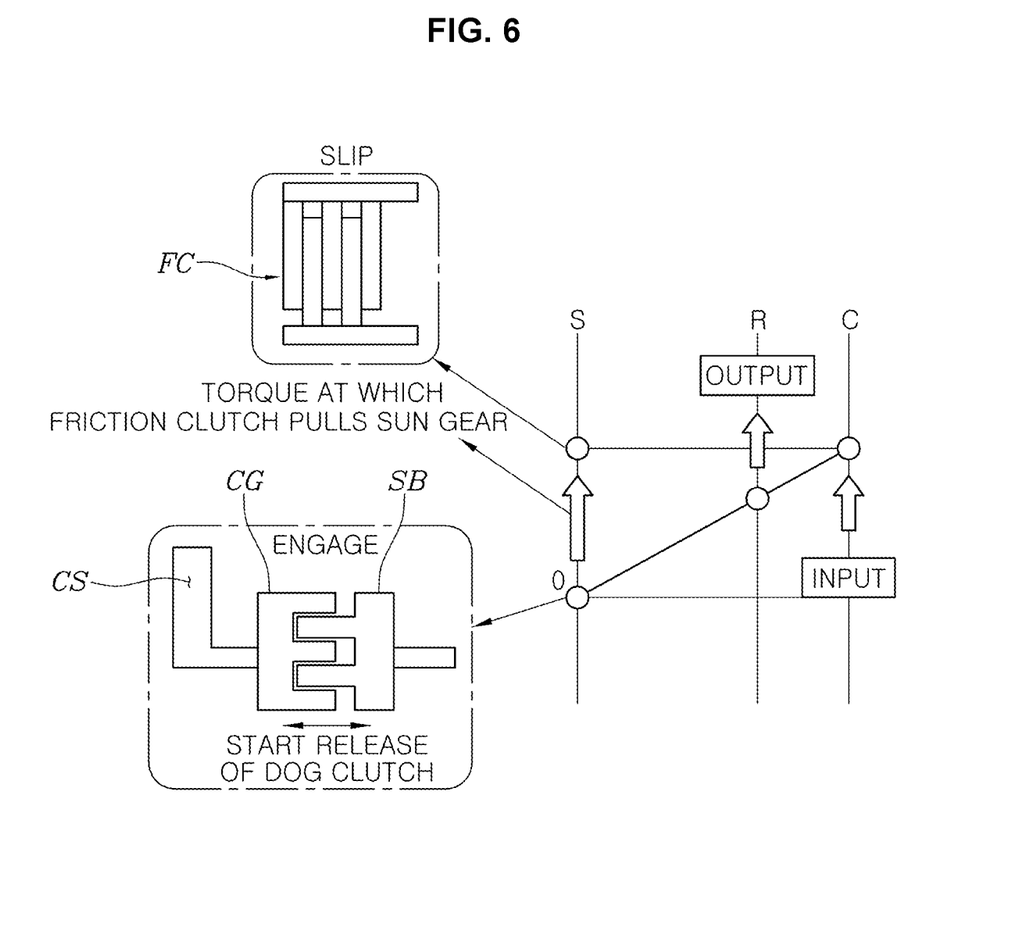
Figure 7:
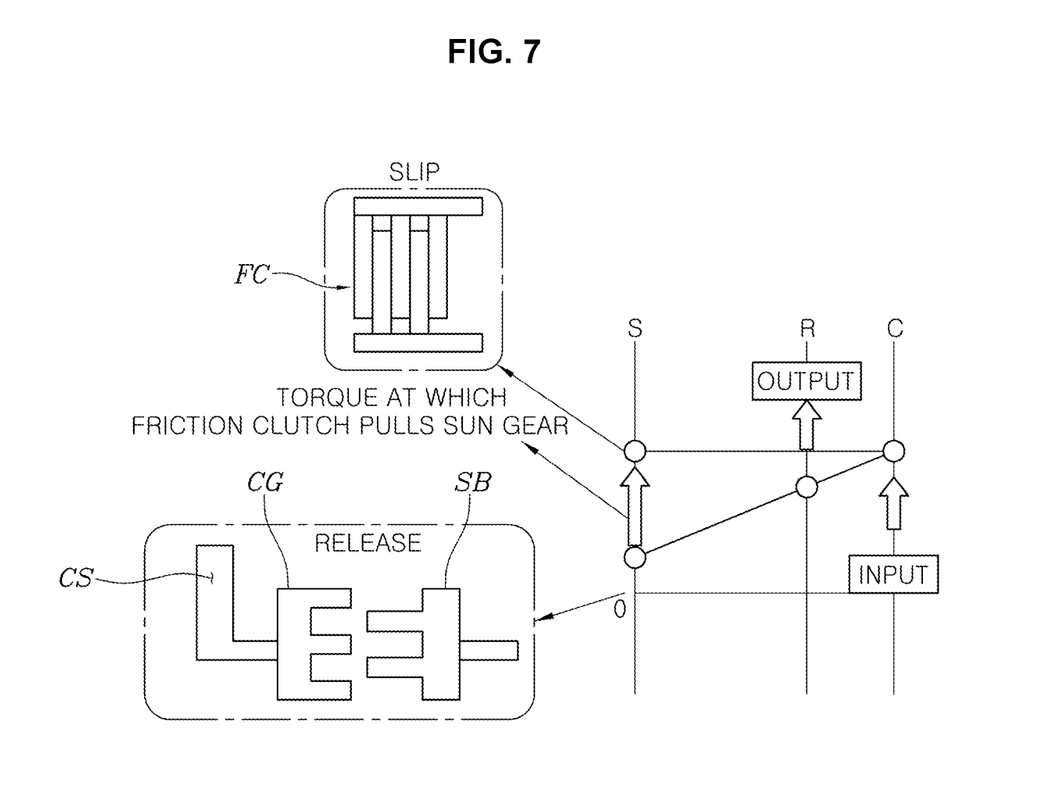

Thereafter, when the push member PM applies more pressure to the friction clutch FC and thus the frictional force of the friction clutch FC is increased, the reaction torque of the sun gear S disappears, the sun gear S tries to be rotated in the same direction as other rotation elements, as shown in FIG. 6, and when the frictional force between the sleeve SB and the clutch gear CG becomes 0, the sleeve SB is moved due to the elastic force of the release spring RS and thus the dog clutch DC is released, as shown in FIG. 7.

That is, engagement of the friction clutch FC and release of the dog clutch DC are achieved through the linear displacement of one linear actuator.

Therefore, the transmission apparatus according to various exemplary embodiments of the present invention may achieve cost reduction and weight reduction through the above-described simple configuration.

Of course, to shift the transmission apparatus from the second speed state to the first speed state, when the hydraulic pressure applied to the piston PN is released, the push member PM is moved to the left in the drawings by the return spring TS, the frictional force of the friction clutch FC is released, the sleeve SB is moved together with the push member PM by the first engaging protrusion P1 and the second engaging protrusion P2 and is thus coupled to the clutch gear CG, and thereby, the dog clutch DC is engaged.

As is apparent from the above description, a transmission apparatus according to various exemplary embodiments of the present invention may achieve cost reduction and weight reduction through a simple configuration, may minimize energy consumed to operate the transmission, and may thus reduce the manufacturing costs and weight of a vehicle and improve the fuel efficiency of the vehicle when the transmission apparatus is ultimately mounted in the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A transmission apparatus comprising:
 a planetary gear set including a first rotation element, a second rotation element and a third rotation element;
 a dog clutch provided to selectively fix one rotation element among the first rotation element, the second rotation element and the third rotation element of the planetary gear set to a stationary member;
 an input shaft and an output shaft respectively connected to two remaining rotation elements of the planetary gear set among the first rotation element, the second rotation element and the third rotation element of the planetary gear set;
 a friction clutch provided to vary frictional force between two arbitrary rotation elements among the first rotation element, the second rotation element and the third rotation element of the planetary gear set;
 a linear actuator provided to transmit linear displacement to apply pressure to the friction clutch;
 a push member provided to receive the linear displacement transmitted from the linear actuator and to apply the pressure to the friction clutch to increase the frictional force of the friction clutch;
 a return spring elastically supporting the push member in a direction of releasing the frictional force of the friction clutch;
 a one-way interlocking structure provided between a sleeve of the dog clutch and the push member to move the sleeve in a direction of engaging the dog clutch when the push member is moved in the direction of releasing the frictional force of the friction clutch; and
 a release spring provided to elastically support the sleeve with respect to the push member in a direction of releasing the dog clutch.

2. The transmission apparatus of claim 1, wherein the one-way interlocking structure includes a relatively uneven structure between the push member and the sleeve.

3. The transmission apparatus of claim 1, wherein the friction clutch is provided to vary frictional force between the first rotation element selectively fixed to the dog clutch and the second rotation element.

4. The transmission apparatus of claim 3, wherein the second rotation element is fixed to the dog clutch.

5. The transmission apparatus of claim 1, wherein the input shaft is fixed to the first rotation element and the output shaft is fixed to the third rotation element.

6. The transmission apparatus of claim 1, wherein the linear actuator includes a piston driven by hydraulic pressure.

7. The transmission apparatus of claim 6, wherein a bearing is provided between the piston and the push member to enable relative rotation thereof.

8. The transmission apparatus of claim 1,
wherein the planetary gear set is a double-pinion planetary gear set including a planet carrier, a ring gear and a sun gear and the first rotation element is the planet carrier, the second rotation elements is the sun gear, the third rotation element is the ring gear, and the stationary member is a transmission housing,
wherein the one rotation element is the planet carrier and the two remaining rotation elements are the sun gear and the ring gear,
wherein the input shaft is connected to the planet carrier of the planetary gear set;
wherein the output shaft is connected to the ring gear of the planetary gear set; and
wherein the sun gear of the planetary gear set is configured to be selectively fixed by the dog clutch to the transmission housing.

9. The transmission apparatus of claim 8, wherein the friction clutch is provided between the sun gear and the planet carrier of the planetary gear set.

10. A complex clutch mechanism for a transmission apparatus, the complex clutch mechanism comprising:
a dog clutch provided to selectively fix a first rotation element of a planetary gear set in the transmission apparatus, to a stationary member;
a friction clutch configured for providing frictional force between the first rotation element and a second rotation element of the planetary gear set;
a push member configured to be moved relative to a sleeve of the dog clutch when the push member is linearly moved in a direction of applying pressure to the friction clutch and to be moved in a state of being interlocked with the sleeve when the push member is linearly moved in a direction of releasing the pressure from the friction clutch;
a return spring elastically supporting the push member in the direction of releasing the pressure from the friction clutch; and
a release spring provided to elastically support the sleeve with respect to the push member in a direction of releasing the dog clutch.

11. The complex clutch mechanism of claim 10,
wherein the push member includes a first engaging protrusion protruding toward the sleeve; and
wherein the sleeve includes a second engaging protrusion engaged with the first engaging protrusion so that the sleeve is moved together with the push member.

12. The complex clutch mechanism of claim 10, wherein the push member receives pressure applied by a piston configured to be linearly moved and transmits the received pressure to the friction clutch.

13. The complex clutch mechanism of claim 12, wherein the push member receives the pressure applied by the piston configured to be linearly moved, through a bearing.

14. The complex clutch mechanism of claim 10, wherein the dog clutch includes:
a hub gear selectively coupled with with the second rotation element of the planetary gear set via the friction clutch;
a clutch gear fixed to the stationary member; and
the sleeve provided to linearly slide in a state of being engaged with an external portion of the hub gear to be engaged with the clutch gear.

15. The complex clutch mechanism of claim 10,
wherein the planetary gear set is a double-pinion planetary gear set including a planet carrier, a ring gear and a sun gear and the first rotation element is the sun gear, the second rotation elements is the planet carrier, the ring gear is a third rotation element of the planetary gear set, and the stationary member is a transmission housing.

* * * * *